United States Patent
Demsky et al.

(10) Patent No.: US 6,917,348 B2
(45) Date of Patent: Jul. 12, 2005

(54) VIDEO DISPLAY MODE FOR DUAL DISPLAYS

(75) Inventors: Scott H. Demsky, Boca Raton, FL (US); Donald A. James, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 10/102,159

(22) Filed: Mar. 20, 2002

(65) Prior Publication Data

US 2003/0179154 A1 Sep. 25, 2003

(51) Int. Cl.$^7$ .................................................. G09G 5/00
(52) U.S. Cl. ........................... 345/1.1; 345/1.3; 345/87
(58) Field of Search ........................... 345/1.1, 1.3, 3.1, 345/87, 98, 103, 3.3

(56) References Cited

U.S. PATENT DOCUMENTS

| | | | |
|---|---|---|---|
| 4,746,981 A | * 5/1988 | Nadan et al. | 348/581 |
| 4,876,657 A | 10/1989 | Saito et al. | 364/521 |
| 5,467,102 A | * 11/1995 | Kuno et al. | 345/1.3 |
| 5,488,385 A | * 1/1996 | Singhal et al. | 345/3.1 |
| 5,585,864 A | * 12/1996 | Takeuchi | 348/719 |
| 5,617,113 A | * 4/1997 | Prince | 345/103 |
| 5,694,141 A | * 12/1997 | Chee | 345/3.1 |
| 5,764,201 A | * 6/1998 | Ranganathan | 345/3.3 |
| 5,841,418 A | 11/1998 | Bril et al. | 345/3 |
| 5,945,974 A | * 8/1999 | Sharma et al. | 345/98 |
| 5,977,933 A | * 11/1999 | Wicher et al. | 345/3.1 |
| 6,091,386 A | * 7/2000 | Bassetti et al. | 345/87 |
| 6,118,413 A | 9/2000 | Bril et al. | 345/3 |
| 6,154,225 A | 11/2000 | Kou et al. | 345/519 |
| 6,215,459 B1 | 4/2001 | Reddy et al. | 345/3 |

* cited by examiner

*Primary Examiner*—Guy J. Lamarre
*Assistant Examiner*—Fritz Alphonse
(74) *Attorney, Agent, or Firm*—Robert Lieber; Richard A. Tomlin

(57) ABSTRACT

A controller, for two display units of a computer system, includes two control elements, VC1 and VC2, having separate connections to the display units. In a dual image (DI) mode of operation, VC1 and VC2 process different data to produce different images at respective display units. In a single Image (SI) mode, VC1 and VC2 process the same data to produce identical images. In DI mode, data applied to each control element represents a portion, less than the whole, of a virtual desktop scene having a display width exceeding width resolution settings of respective displays. In this mode VC1 can be controlled manually to scan the entire virtual scene piecemeal, while VC2 is constrained to process only a fixed portion of that scene. In a preferred embodiment, the virtual scene includes private and public areas. The private area shows notes intended for viewing only by a presenter of images shown in the public area, and the public area shows images viewable both by the presenter and an audience. In this arrangement, the display connected to VC1 can display the entire virtual scene to the presenter in a piecemeal fashion, while the second display shows only the public area to the audience.

4 Claims, 5 Drawing Sheets

Fig. 1
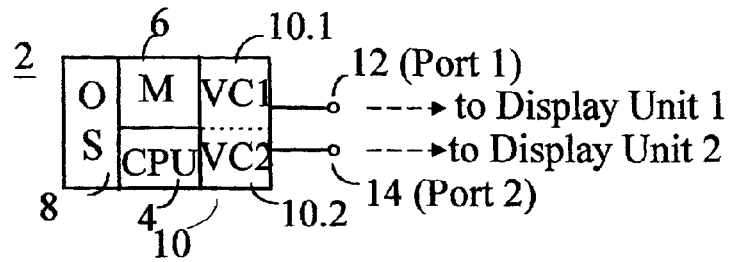
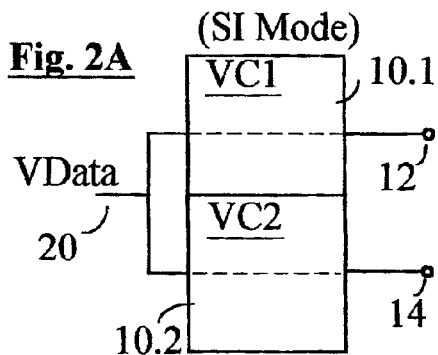
Fig. 2A (SI Mode)
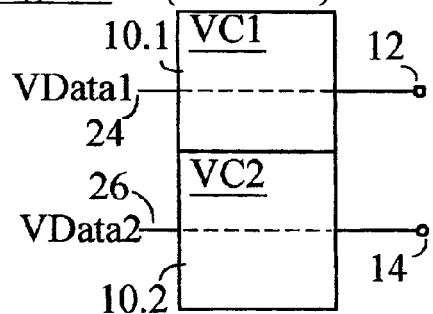
Fig. 2B (DI Mode)
Fig. 3
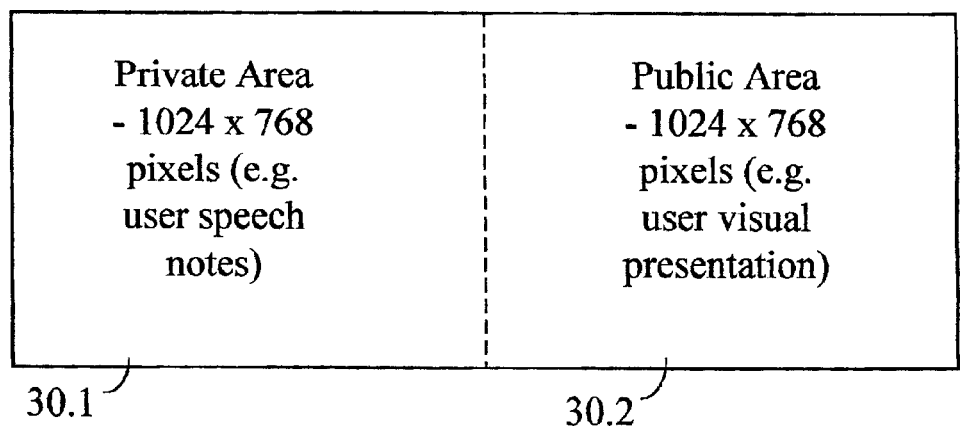

Fig. 5
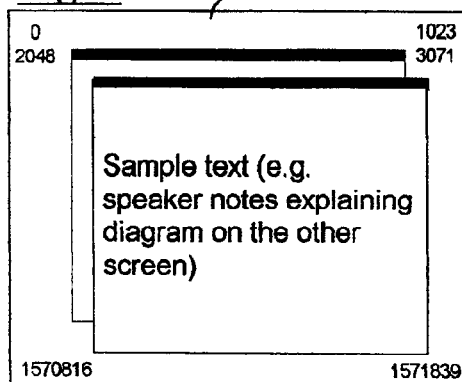
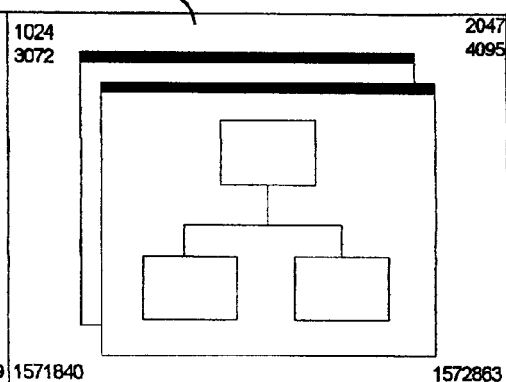
50 —
VC2
Reads pixels for first line (1024 - 2047)
Reads pixels for second line (3072 - 4095)
.
.
Reads pixels for last line (1571840 - 1572863)
Display 2
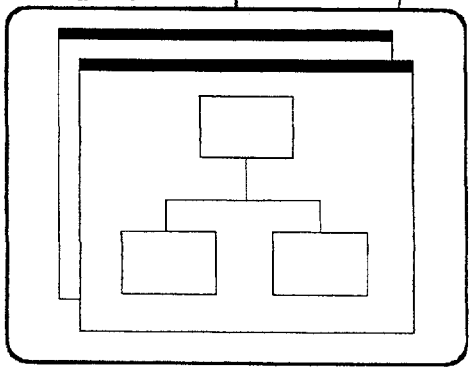
Fig. 6
| Fig. 6a |
| Fig. 6b |

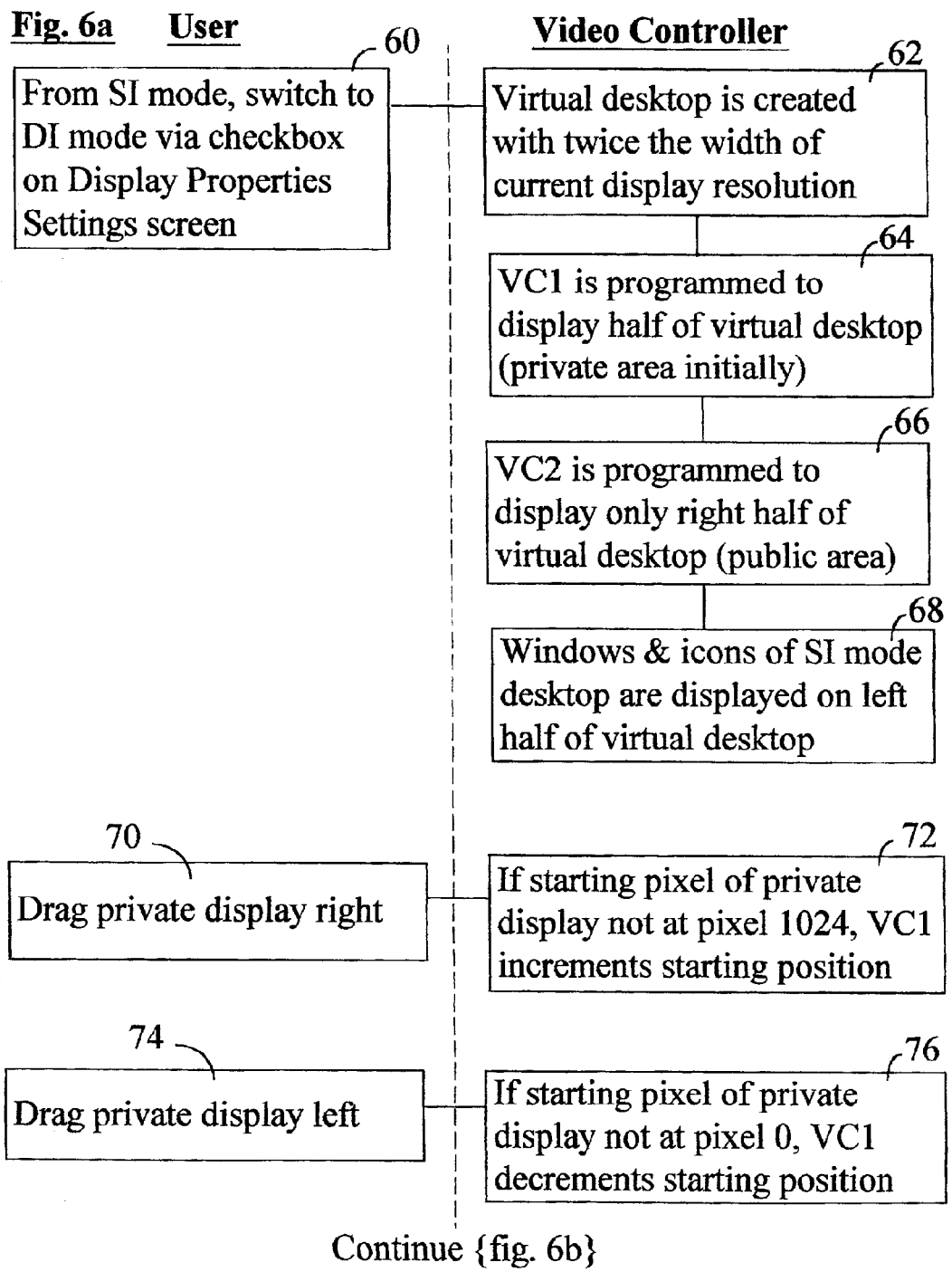

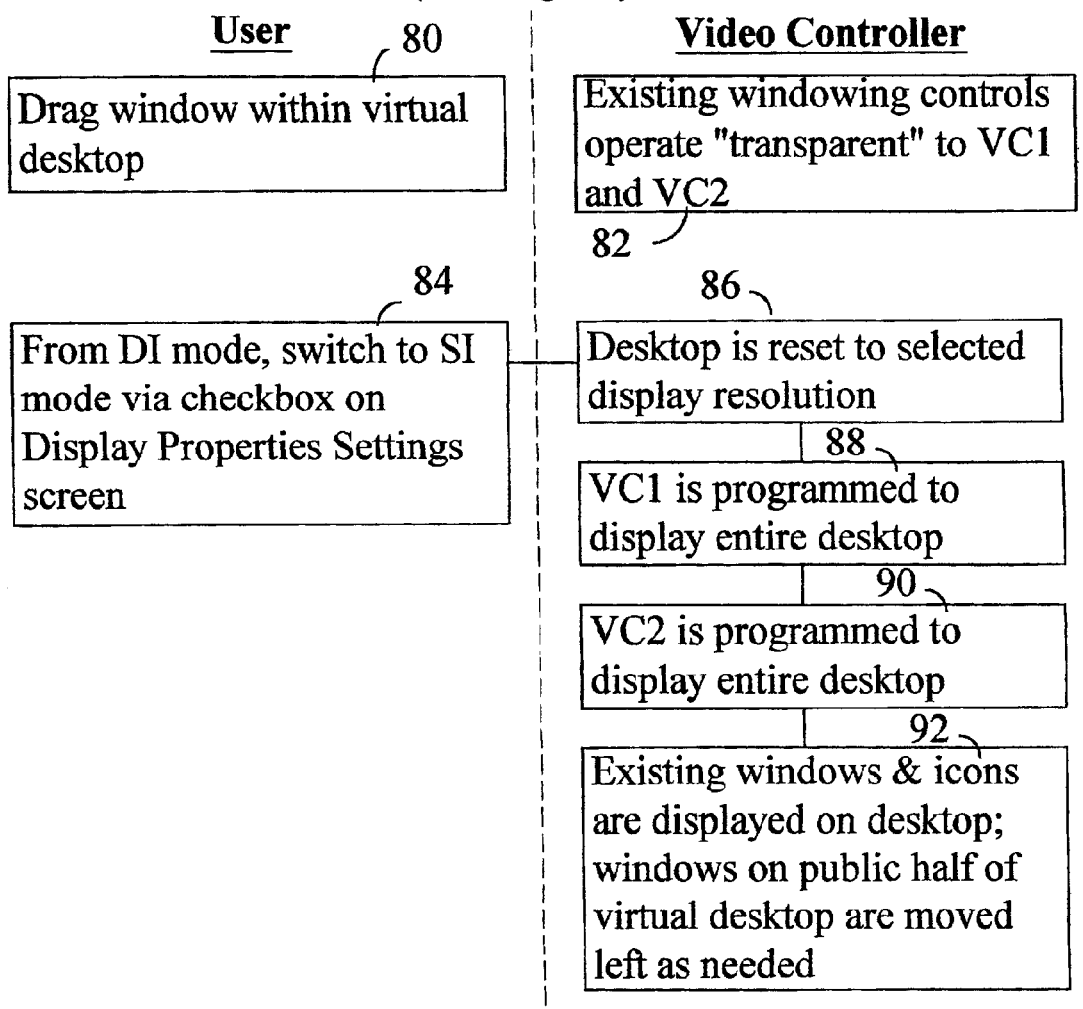

VIDEO DISPLAY MODE FOR DUAL DISPLAYS

BACKGROUND OF THE INVENTION

Some computer systems support use of dual displays. For instance, some personal computer systems are adapted to feed images to two display ports; one port attaching to a primary display unit and the other attaching to a secondary display unit. For such dual display arrangements, existing software only allows feeding of identical images to both display units.

However, this constraint may not be suited for presentations of display material containing private or confidential matter not intended for viewing by the public at large. Consider, for instance, a presentation to an audience given by a user of a computer adapted for dual display usage (e.g. a laptop computer); wherein a basic display port is coupled to a local monitor (e.g. a laptop LCD) seen only by the user, and a secondary display port is coupled to a remote display (e.g. a projection system) having an image seen by the audience. Assume further that the image to be shown on the local monitor contains both public matter to be shown to the audience and private matter (e.g. speech notes) intended to be viewed only by the computer user. Although the private matter is not intended to be seen by the audience, it needs to be kept together with the public matter, at the local monitor, so as to properly cue or otherwise facilitate oral explanation of the public matter.

Accordingly, the problem addressed by the present invention is to adapt a computer system supporting dual displays to allow for feeding different images simultaneously to the two ports; a particular use for this being to allow for displaying both private and public matter on a primary local display unit, while restricting images fed to a secondary display unit (either local or remote) to only the public matter.

SUMMARY OF THE INVENTION

In a preferred embodiment the invention comprises a video adapter system having connections to two video output ports of a computer system supporting dual displays—typically, a personal computer (PC) system—and having a unique mode of operation relative to these ports, enabling the adapter system to convey different display images simultaneously through the two ports. Thus, if one port connects to a primary local display unit seen only by the computer user, and the other port connects to a secondary display unit (either local or remote) viewed by an audience, the invention allows for applying signals representing different video data to the two ports, whereby different images are produced at the primary and secondary displays. In this way, a computer user, making an oral presentation associated with images shown at the secondary display, may simultaneously view (at the local basic display) both the image seen by the audience and private matter not intended for viewing by the audience (for example, presentation notes intended to cue the user's oral presentation of what is seen on the secondary display).

In a preferred embodiment, the present video adapter has two video controller elements, one controlling a port connecting to a primary display unit and the other separately controlling a port connecting to a secondary display unit. These controller elements have two different modes of operation; one termed a single image (SI) mode and another termed a dual image (DI) mode.

In SI mode, the two controller elements process identical video data, and thereby feed identical display images to the primary and secondary displays. However, in DI mode, the controllers may process different video data and thereby feed different images to the primary and secondary displays. Images produced in either mode may contain plural windows or other objects of the type generated by contemporary windowing operating systems and their compatible applications. However, it is believed that existing systems for producing dual video displays do not have an operating mode comparable to the DI mode; i.e. a mode whereby different images are simultaneously produced at the dual displays.

In DI mode, the video controller elements presently contemplated process video data sets associated with discrete portions of a virtual desktop which cannot be shown in entirety at either the basic or secondary display due to resolution limitations. The virtual desktop contains private and public portions. The controller directing formation of the secondary display image is restricted to presenting only the public portion of this virtual desktop, while the controller directing formation of the primary display image is capable of presenting any portion of the virtual desktop; e.g. by performing panning or switching operations relative to video data memory maps associated with both the private and public portions. Consequently, persons viewing the secondary display see images associated only with the public portion, whereas the user of the computer containing these control elements is able to see images extending over both private and public portions.

Of ancillary relevance to this invention, it is noted that display images contained in both the private and public portions of the presently contemplated virtual desktop may include windows of the type produced by contemporary windowing operating systems. These windows and operations performed by a user relative thereto (e.g. drag and drop operations relative to windows and image objects within them) are managed by the operating system and related applications in a manner transparent to operations of the presently contemplated controller elements. Accordingly, a user of the present invention may drag and drop windows and other objects throughout a desktop view in a manner that is effectively transparent to the invention per se.

An interesting operation permitted by the foregoing feature is that the user is able to drag and drop objects between the private and public areas of the foregoing virtual desktop—as a consequence of operations of the controller element directing formation of the image seen at the basic display, and operations of the operating system and its applications—whereby effects are created at the public/secondary display of adding objects previously seen only on the private/basic display and of removing objects from view on the secondary display.

A preferred implementation of the subject dual mode video controllers is as driver software compatible with operating systems and applications presently used in computers. However, it will be understood that in alternative implementations some or all of the functions performed by these controllers may be relegated to firmware or discrete hardware.

These and other features, advantages, benefits and uses of the invention will be more fully understood and appreciated by considering the following description.

BRIEF DESCRIPTION OF DRAWINGS

FIG. 1 is a block diagram of a computer system containing the subject video controllers.

FIGS. 2A and 2B schematically illustrate how the subject controllers work in their single image (SI) and different image (DI) modes of operation; FIG. 2A showing their operations in SI mode, and FIG. 2B showing their operations in DI mode.

FIG. 3 broadly illustrates a logical memory map of a virtual desktop created by the present invention for its DI mode of operation.

FIG. 5 illustrates the same virtual mapping details as FIG. 4, but in conjunction with a text block outlining operations of the present secondary controller in DI mode and a graphic representation of a display image associated exclusively with the public area of the virtual desktop associated with the mapping, for explaining the limited operations performed by the secondary controller element in this mode.

FIGS. 6a and 6b, connected as shown in FIG. 6, form a single schematic flow diagram for explaining functions performed by the subject primary and secondary display controller elements, and display image effects produced thereby, in response to manual actions performed by a user of the invention (e.g. via manipulations of a conventional mouse pointer).

DETAILED DESCRIPTION

Figure 4:
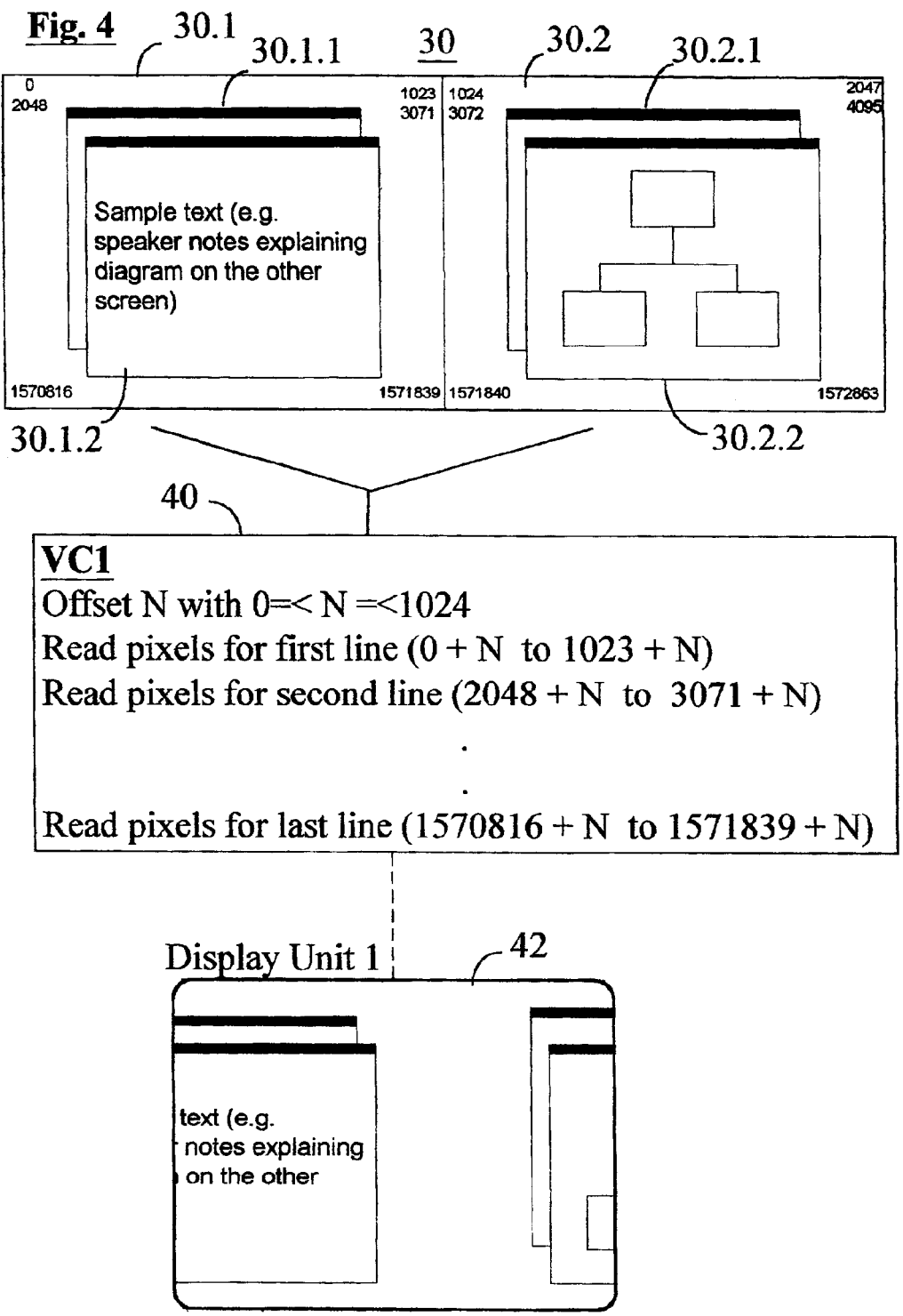
FIG. 4 illustrates details of the virtual mapping of FIG. 3, in conjunction with a text block outlining operations of the present basic display controller element and a graphic representation of basic display imaging effects, for explaining panning operations of the basic display controller element, in DI mode, relative to private and public areas of the virtual desktop map seen in this figure.

FIG. 1 schematically illustrates the organization of a typical digital computer system configured in accordance with the present invention. The computer system, seen at 2, comprises a central processor (CPU) 4, memory (M) 6, and operating system (OS) 8 that are typical of most if not all contemporary systems. It is understood, although not explicitly shown, that memory 6 may include both a hard drive and a random access memory (RAM), and that OS 8 may at times reside in both the hard drive and RAM.

In addition to the foregoing components, computer system 2 contains video controller 10 associated with the present invention. Controller 10 comprises two discretely separate video controller elements, VC1 and VC2. VC1, shown at 10.1, and VC2, shown at 10.2, respectively link to first and second display ports 12 and 14. These ports respectively connect to first and second display units not shown in this figure. Hereafter, display port 12 will also be referred to as the basic display port, and the display unit to which it connects will also be termed the basic display unit. Similarly, the display port 14 will also be called the secondary display port, and the display unit to which it connects will also be called the secondary display unit.

Although not of direct relevance to the invention, it will be understood that, depending upon requirements of the basic and secondary display units, VC1 and VC2 may operate in different signal processing modes. For instance, although both controller elements may receive video data that is initially in a digital form it is possible that one may handle the signals representing that data in a digital form relative to the associated port and the other may handle such signals in an analog form relative to its associated port.

FIGS. 2A and 2B illustrate in broad outline how VC1 and VC2 operate respectively in their SI and DI modes.

In SI mode, VC1 and VC2 the same video data 20 (labeled "VData"), and consequently convey identical display images to their respective ports 12 and 14. Assuming that the basic and secondary display units, associated respectively with VC1 and VC2, have resolutions supporting a display matrix of 1,024 by 768 pixels, it is understood that in SI mode the common video data supplied to VC1 and VC2 would correspond to a logical memory map of information defining 1,024 by 768 pixels.

In DI mode, however, VC1 receives VData1 at 24 and VC2 receives VData2 at 26, where 24 and 26 may connect to different data sources. Consequently VC1 and VC2 convey display images to their respective ports which may be either the same or different, depending upon the data sources feeding 24 and 26.

Practical uses for the foregoing DI mode capability—specifically for the purpose of enabling a computer user to display information to an audience while orally explaining the significance of that information—are explained with reference to FIGS. 3 through 6.

FIG. 3 shows a virtual desktop image outline 30 associated with DI mode. Image 30 contains a "private" image area 30.1 and a "public" area 30.2. It will be shown below that VC1 may form display images (at display unit 1 via port 1) encompassing either of these areas, or parts of both areas, whereas VC2 is restricted to process video data associated solely with public area 30.2. Thus, VC1 enables a user of the system to view both private and public area information on a basic display unit, while restricting an audience receiving a presentation or briefing from that user to view only public information on a secondary display unit. Since each of these areas encompasses a pixel array of 1,024×768 pixels, as shown in this figure, it will be seen that VC1 cannot display the virtual desktop in its entirety at one showing; but with panning capabilities explained below, VC1 can operate to effectively display the entire virtual desktop piecemeal, in panned increments of 1024×768 pixels.

FIG. 4 shows details of a logical memory map associated with a specific example of information contained in virtual desktop 30, in conjunction with a text block 40 constituting the equivalent of a flow diagram associated with this example, and an exemplary display illustration 42 also associated with this example. As seen at 30, in FIG. 4, desktop 30 contains private and public areas, 30.1 and 30.2 respectively, corresponding to the same-numbered areas shown in FIG. 3.

In addition, shown in small print at the corners of each area 30.1 and 30.2, in FIG. 4, are numbers representing display pixel raster coordinates of video data representing respective area images.

FIG. 4 also suggests that private area 30.1 of desktop 30 may contain several display windows 30.1.1 and 30.1.2, and public area 30.2 may contain corresponding windows, 30.2.1 and 30.2.2. respectively. As an example of how these areas and windows are used, FIG. 4 indicates that window 30.2.2 may contain a diagram, exemplified as a block diagram, and corresponding window 30.1.2 may contain text representing speaker notes, for use solely by the system user as an aid in orally explaining or presenting the diagram shown at 30.2.2 to an audience viewing the secondary display unit (e.g. at a projection screen remote from the presenter/user).

As indicated at 40, VC1 receives a variable offset N (as a function of a user panning operation explained below), and uses that offset to scan parts of lines of video data in a memory map of the virtual desktop to form a display image 42, at the basic display unit 1 (recall FIG. 1). Consequently, this image may contain either the private or public area of the virtual desktop, or portions of both areas. Depending on the value of offset N, display 42 may contain only the private area, only the public area, or portions of both areas.

In a similar manner, FIG. 5 shows the specific desktop view of FIG. 4, in conjunction with a text block 50 representing the equivalent of a flow diagram for explaining DI mode operations of VC2, and display image 52 produced thereby at secondary display unit 2. However, since the variable offset N does not apply to these operations (see block 50), and since line coordinates given in this block lie only in the public area of the virtual desktop, display image 52 is confined exclusively to the public area 30.2.

FIGS. 6*a* and 6*b*, arranged together as shown in FIG. 6, constitute a schematic for explaining operations of VC1 and VC2 in both SI and DI modes. Each fig. is vertically divided into two columns, one for explaining operations performed by a user of the invention, and the other for explaining controller operations resulting as responses to such user actions.

As shown at 60, the present controller arrangement is switched from SI mode to DI mode by a user action; e.g. selection of (clicking on) a not-shown checkbox (or tool bar element) on the common basic/secondary display screen image associated with SI mode. Operation(s) 62, resulting from this action, cause the (windowing operating) system to form a logical memory map of a virtual desktop image 30 of the type shown in FIGS. 3–5, with twice the width of the common SI mode display. As indicated at 64, in response to the mode switch, VC1 is programmed to initially display the private half 30.1 of the virtual desktop (i.e. referring to FIG. 4, with an initial offset N=0). At the same time, as shown at 66, VC2 is programmed to display only the public half 30.2 of the virtual desktop. In this mode, as indicated at 68, windows and icons associated with the common SI mode display are displayed only in the private/left half 30.1 of the virtual desktop.

As seen at 70 and 72, as the user drags the image of the private display area to the right, VC1 conditionally increments the offset value to move the image seen at the basic display incrementally to the right relative to the virtual desktop. As shown at 72, if the value of N is other than the maximum value 1024 during this dragging operation (i.e. other than the value associated with generation of the public area of the virtual desktop), N is incremented with the effect that the basic display image is incrementally moved to the right relative to the virtual desktop. It is understood, therefore, that with such incrementing of the offset, the image shown at the basic display pans gradually to the right in relation to the lateral range of the virtual desktop. Accordingly, this allows the user of the invention to view portions of the private and public areas simultaneously, and to drag and drop objects between these portions as permitted by the operating system and related applications.

As suggested at 74 and 76, if the user drags the basic display image to the left, while VC1 is operating with an offset other than the minimum value zero (i.e. while the basic display is showing all or part of the public area of the virtual desktop), offset N is decreased, so as to effectively pan the basic display image to the left relative to the virtual desktop.

As suggested at 80 and 82, when the user drags a window within the virtual desktop, windowing processes of the operating system operate to move the window to the location pointed to by the user. These windowing processes are effectively transparent to operations of both VC1 and VC2 and the resulting final location of the dragged window could be in the private area, the public area or partially in each area. As a corollary, it is noted (but not specifically illustrated) that if the user drags an object within a window, or between windows, the operating system and relevant application software would act, transparent to both VC1 and VC2, to effectively move the object to the designated virtual desktop location.

Finally, as indicated at 84, the user may switch the system back to SI mode via an operation similar to that performed at 60. As indicated at 86, this causes the video data defining the desktop to be reset to the selected display resolution associated with SI mode (in the present example, 1024×768 pixels), and adapts VC1 and VC2 to display identical views of the entire real desktop associated with this mode (boxes 88 and 90). In this mode, windows and icons are relocated to the real desktop so as to be shown at both the basic and secondary displays.

Functions described above as relevant to this invention can be implemented in various forms; e.g. software, hardware, or a combination of software and hardware. When implemented in software, these functions may be embodied in programs installed in user computers. Installation may be accomplished from readable storage media directly or via data networks like the Internet.

Programs in the presently intended context are expressions in any language, code or notation, such expressions constituting sets of instructions which, when executed by a digital computer (or equivalent device) cause the relevant functions to be performed. Accordingly, we claim as follows.

What is claimed is:

1. A dual video display controller for a digital computer system having separate first and second video output ports for connecting respectively to first and second video display units, said controller being adapted to provide said display units with data forming display images of a predetermined pixel width at both of said units; said controller comprising:

a source of video data representing a logical map of a virtual display image having a display width in pixels greater than said predetermined pixel width; and first and second control elements (VC1 and VC2) capable of receiving portions of said video data defining different parts of said virtual image, and for applying said received portions respectively to said first and second display units via respective said first and second ports; whereby different parts of said virtual image are displayed at said first and second display units; and wherein:

said virtual image contains private and public image areas, said private area containing private information intended to be viewed only by an immediate user of a said computer system containing said controller, and said public area containing information intended for viewing by both said immediate user and persons other than said immediate user;

said portions of said video data received by said control element VC1 define a display image of parts less than the whole of said virtual image, such parts being susceptible of including portions of both said private and public areas, and said portions of said video data received by said control element VC2 define a display image confined exclusively to said public area portion of said virtual image; whereby images formed at said first and second display units correspond respectively to the images defined by said data portions respectively received by VC1 and VC2, and whereby less than the whole of said virtual image is seen at each of said display units at any instant of time;

said portions of data supplied to VC1 being subject to manipulation by a said immediate user for enabling said user to view the whole of said virtual image in a piecemeal fashion;

said dual controller having two different modes of operation—a single image (SI) mode and a dual image (DI) mode; said controller operating in said DI mode to apply said data portions defining parts of said virtual image to VC1 and VC2 as defined above; said controller operating in said SI mode to apply video data defining a real image having said predetermined pixel width when displayed directly to both VC1 and VC2;

said real image applied in said SI mode thereby being instantly viewable in its entirety at both said first and second display units, without manipulation by said immediate user; whereby said dual controller is useful:

in said SI mode, to instantly display the whole of a said real image at both said first and second display units, in said DI mode, to instantly display only parts less than the whole of a said virtual image at both said first and second display units; and in both said SI and DI modes, to produce display images with a constant display width pixel resolution that needn't be adjusted when the mode is changed.

2. A dual video display controller in accordance with claim 1 wherein said public and private areas of said virtual desktop are each capable of occupying the entire viewing area of said first display unit; and said first controller element VC1 is useful to apply video data representing select portions of said virtual image to said first display unit so as to create display effects at said first display unit wherein different portions of said virtual image are displayed at different times at said first display unit for enabling said immediate user to view the whole of said virtual image in said piecemeal fashion.

3. A program for use in a computer system having first and second video display output ports, said program comprising:

first and second control elements (VC1 and VC2) respectively controlling application of video data to said first and second ports; said first and second elements being subject to operation independent of each other whereby data applied to said first and second ports may be used to generate different video image; wherein said elements are useful to form images of a single predetermined pixel width resolution at display units coupled respectively to said first and second ports; and further wherein:

said first and second elements we operable in dual image (DI) and single image (SI) modes; said elements operating in said DI mode to feed data representing different portions of a virtual image having a display width in pixels exceeding said predetermined width resolution to respective said first and second ports; said elements operating in said SI mode to feed data representing the whole of a real image having a display width in pixels corresponding to said predetermined width resolution to both said first and second ports; said virtual image applied in said D1 mode containing both a private area, intended for viewing only by an immediate user of said program via a display unit linked to said first output port, and a public area intended for viewing by both said immediate user and other persons at display units linked to both said first and second ports said first element being adapted further, when operating in said DI mode, to enable a said immediate user to manipulate the data being fed to said first output port, whereby said user may view the whole of said virtual image piecemeal at a said display unit linked to said first output port.

4. A program in accordance with claim 3 wherein said first and second elements may be operated to produce both different video images and identical video images at display units linked to respective said first and second ports, without requiring modification of pixel width resolution settings for either display unit when switching between said DI and SI modes, thereby enabling both said units to accommodate the aforesaid operations efficiently in both said modes.

* * * * *